United States Patent [19]
Janosik, Sr.

[11] 4,437,736
[45] Mar. 20, 1984

[54] SUN VIEWING APPARATUS

[76] Inventor: Daniel R. Janosik, Sr., R.D. #1, Box 45-A, Hawley, Pa. 18428

[21] Appl. No.: 423,164

[22] Filed: Sep. 24, 1982

Related U.S. Application Data

[63] Continuation-in-part of Ser. No. 107,336, Dec. 26, 1979, abandoned.

[51] Int. Cl.³ .................... G02B 23/02; G02B 23/16
[52] U.S. Cl. .................................. 350/538; 350/301; 350/569
[58] Field of Search ............. 350/538, 569, 571, 5.76, 350/1.2, 301

[56] References Cited

U.S. PATENT DOCUMENTS

| Re. 17,995 | 3/1931 | Mitchell | 350/576 |
| 3,041,916 | 7/1962 | Clave et al. | 350/301 |
| 3,409,343 | 11/1968 | Zapp | 350/569 |
| 4,142,800 | 3/1979 | Paget | 350/569 |

*Primary Examiner*—William H. Punter
*Attorney, Agent, or Firm*—Anthony J. Dixon

[57] ABSTRACT

A self-contained prefocused solar viewing apparatus which comprises a light shielding container with apertures for admitting solar rays and viewing same and a series of pre-aligned prisms and lenses to display the sun's image on a viewing surface without threat of eye damage in that the viewer's eye is away from the direct path of potentially harmful light rays.

4 Claims, 5 Drawing Figures

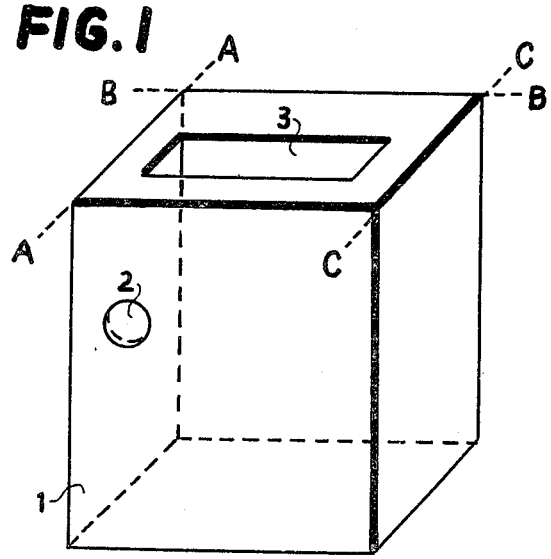
FIG. 1
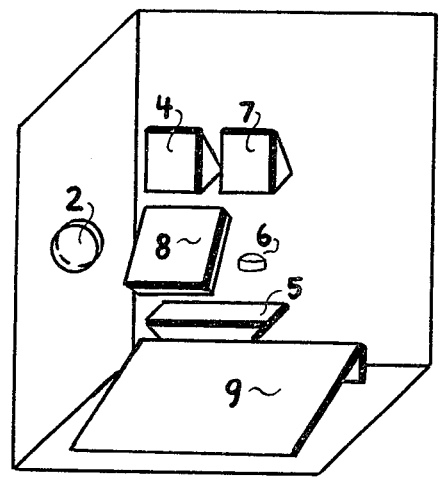
FIG. 2
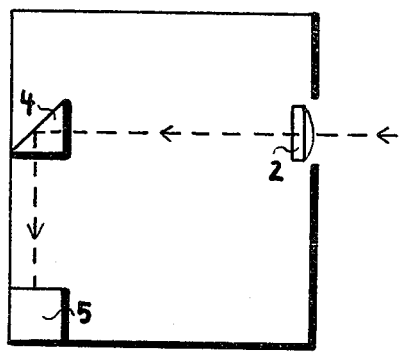
FIG. 3 (A-A)
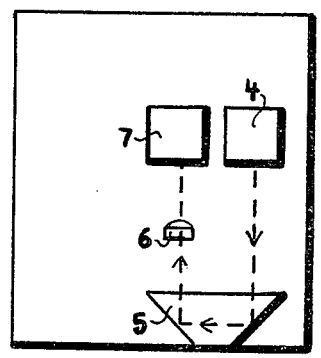
FIG. 4 (B-B)
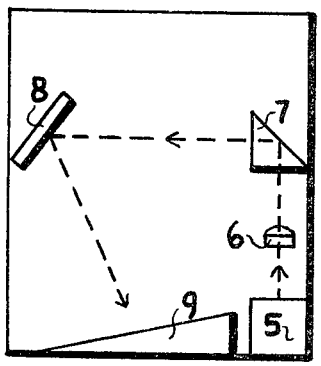
FIG. 5 (C-C)
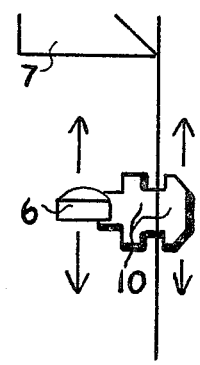
FIG. 6

SUN VIEWING APPARATUS

CROSS REFERENCE TO RELATED APPLICATIONS

This application is a continuation-in-part of application Ser. No. 107,336, filed Dec. 26, 1979 now abandoned by the same inventor.

BACKGROUND OF THE INVENTION

Observation of the sun has long been an activity with inherent dangers of eye damage not usually appreciated by the casual or lay observer. Direct viewing of bodies of intense luminosity with the naked eye is substantially impossible and even dangerous to the retina. Thus even at times of eclipse proper viewing of this phenomenon requires at least the interposition of a heavily tinted or smoked glass plate. Even in this fashion, such viewing leaves much to be desired. If intensification of the luminosity through a telescope of the like is employed, extreme hazards may befall the eye of the observer.

Many methods have been devised to overcome such problems, among them simple filters and indirect viewing mechanisms however, the cost and complexity of such mechanisms have made their use by the layman slight. Simplified systems often result in loss of much of the resolution of the body being viewed.

Green glass filters have been disclosed by U.S. Pat. No. 3,351,408 issued to Krewalk for use with telescopes. Evert, in U.S. Pat. No. 4,027,943 also discloses a telescope adapter which allows indirect viewing in a second focal plane from the plane of the telescope eye piece. U.S. No. Re: 17,995 issued to Mitchell is essentially a size-reducing view finder which requires focusing. U.K. Pat. No. 1,071,150 issued to Zapp suffers from the direct view dangers which the present application seeks to avoid.

Although these references and the art in general discuss solar viewing with or without telescopes, a simple hand held solar viewing apparatus usable by the layman without focusing has not been disclosed.

SUMMARY OF THE INVENTION

It is an object of the present invention to provide a one piece solar viewing device for enabling rapid observation of solar phenomenon without focusing or time consuming assembly.

It is a further object to provide a device useable by amateurs and laymen with complete safety from previous risks to the eye of the observer.

It is a further object to provide an inexpensive solar viewing device which contains a minimum number of optical elements so that it is available to non-professional solar observers.

It is a further object to provide a rapid means to view any high intensity light source with complete safety to the observer.

These and other objects are achieved with the present invention which comprises a one-piece solar viewing apparatus which is self-contained and comprises:

(a) means for admitting the light emanating from the sun or other high intensity light source (b) a first or objective lens of a relatively small aperture, probably less than ten (10) millimeters in diameter (c) a first total reflecting prism in the plane of said first lens (d) a second reflecting prism (e) a second or field lens (f) a third reflecting prism in the plane of said second lens (g) a reflecting surface such as a mirror (h) a screen or viewing surface; and (i) means for the observer to see the viewing surface; and (j) a light shielding container wherein said elements are placed whereby light rays emanating from the sun or light source are admitted in a first plane, reflected into a second plane by said first total reflecting prism, thereby said light rays strike said second total reflecting prism, reflected thereby into said second light ray converging lens or field lens which is located at the plane of the real image formed by said first objective lens causing said light rays to strike said third reflecting prism, reflected thereby into a reflecting means such as a mirror and a magnified and unintensified image is thereupon reflected and displayed on a screen or viewing surface visable from outside said container.

In this manner the sun's surface can be safely viewed in detail by the observer without need for time consuming focusing in complete safety in that the viewer's eye is never in the direct path or potentially harmful light rays.

These and other objects and advantages of the invention will be apparent from the following detailed description of a preferred embodiment of the invention.

BRIEF DESCRIPTION OF THE DRAWINGS

FIG. 1 is a frontal outside view of the sun viewing apparatus made in accordance with the invention.

FIG. 2 is a frontal inside view in the same plane as FIG. 1.

FIG. 3 is a cross-section A—A of FIG. 1.

FIG. 4 is a cross-section B—B of FIG. 1.

FIG. 5 is a cross-section C—C of FIG. 1.

FIG. 6 is a planar view showing focusing mechanism.

DESCRIPTION OF THE PREFERRED EMBODIMENT

Referring to FIG. 1 six sided, the light-shielding container is shown with body 1 having a first objective lens 2 of a relatively small aperture to reduce the intensity of the final image to be viewed where through the sun's rays are admitted to the interior of the container and larger aperture 3 in a plane perpendicular to the plane of lens 2 whereby the observer can view the interior of the container.

In FIG. 2, the interior configuration can be seen clearly and the relative placement of the components can be viewed.

A first total reflecting prism is placed with one face aligned to receive high intensity light rays entering the container in a first plane which is in the plane of the lens 2. This prism has a prismatic configuration whereby said rays are reflected into a second plane whereby said rays fall upon the face of a second prism aligned so as to direct the light rays striking it into a magnifying field lens 6, to further reduce the intensity of the final image to be viewed whereby said rays are caused to strike a third reflecting prism, 7 in the plane of said lens, 6. The light rays are then reflected to a simple reflecting means, 8 such as a mirror aligned to reflect the magnified image striking it onto a viewing surface or screen, 9, positioned to be seen from viewing aperture 3. Further, said screen can be positioned outside of the body, 1, by adjustment of reflecting means, 8, to reflect the image onto a different plane.

By corrent placement and prefocusing in construction of the present invention immediate solar viewing is capable with the completed device without the need for refocusing at each use.

Light rays will enter through lens 2 which is pointed at the sun. The rays strike on prism 4, are reflected into prism 5, in a concentrated beam, are then reflected through lens 6 to converge said beam to enhance the eventual display of the phenomenon being viewed, are then reflected through prism 7 to strike simple reflecting means, 8, which causes the rays to strike screen whereby the observer has a complete view of the phenomenon through viewing aperture 3.

At no time is the observer's eye, 10, in direct alignment with the solar rays thereby providing complete viewing safety.

The ease of use makes the present invention ideal for the casual solar observer, layman or novice; however, it can also greatly benefit the expert observer by providing a rapid means to determine whether or not more expensive equipment should be set up.

Bodies of normal viewing intensities such as intermittent clouds will not be visable on the viewing screen with the present device unless such bodies pass between the device and the light source being viewed.

In a sample construction the inside dimensions of the cube shaped container are about four and one-half inches with lens 2 being about ten millimeters, and lens 6 being about six millimeters allowing a screen image on screen 9 to be at least about fifty-five millimeters in diameter. Objective lens 2 is preferably cut down from a larger lens allowing a sharper final image while reducing color aberrations. Although these dimensions are not meant to be limiting of the scope of the present invention, they are presented here to give the relative dimensions obtainable with the present apparatus.

It is also envisioned if more resolution is needed, a larger aperture may be employed of a colored lens, yellow preferable, to further enhance the final image while reducing the intensity and further to help correct longitudinal color aberrations when simple lenses are used. Said aperture would be greater than about ten millimeters.

The preliminary focusing of the various optical components is done in initial construction of the device and upon completion the user need only point lens 2 at the sun to see the image displayed on screen 9.

It is also envisioned that lens 6 can be moved relative to prisms 5 and 7 so as to adapt its focus to the light source being viewed. Means for said movement can be standard telescopic focusing means as shown in FIG. 6.

It is also envisioned that the walls of said container or body 1, can be constructed so as to collapse or open in a telescopic fashion by having the body constructed to two five-sided cubes with the side of one being accommodated by the other so that the two cubes are slidingly assembled to form one six-sided box.

It is believed that the advantages and results furnished by the present invention are apparent from the foregoing description of the preferred embodiment thereof; however, various changes and modifications may be made without departing from the spirit and scope of the present invention as defined by the following claims.

I claim:

1. A prefocused solar viewing apparatus self contained in a cubicle container comprising:
   a. means for admitting solar rays comprising a first aperture in a first side of said cubicle
   b. an objective lens
   c. a first total reflecting prism in the plane of said first lens
   d. a second reflecting prism
   e. a magnifying field lens
   f. a third reflecting prism in the plane of said field lens
   g. means for reflecting light
   h. a viewing surface
   i. means to observe sun viewing surface which comprises a second aperture essentially larger than said first aperture in a second side of said cubical perpendicular to said first side,
   j. a light shielding container wherein said elements are fixedly mounted whereby solar rays are admitted into said container through, a, by pointing said first aperture at the sun, said rays are admitted by, b, into a first plane and reflected by, c, into a second plane thereby striking said second prism, d, and reflected thereby into said magnifying field lens e causing said light rays to strike the third reflecting prism f and reflected thereby onto said reflecting means, g, and reflected thereby onto said viewing surface h visable from outside said container by means, i, without direct impingement of the solar rays upon the eye of the user.

2. The apparatus of claim 1 wherein said objective lens is tinted.

3. The apparatus of claim 1 wherein said cube is comprised of a first and second five-sided cube wherein said first cube is accommodatingly larger than said second cube to allow said first cube to slide within said second cube to form a six-sided container.

4. The device of claim 1 wherein element e is moveably mounted in said container to provide focusing.

* * * * *